(12) United States Patent
Ruuska et al.

(10) Patent No.: US 7,760,671 B2
(45) Date of Patent: Jul. 20, 2010

(54) PROTOCOL FOR INDICATING ENHANCED CAPABILITIES FOR USE BY SHORT-RANGE WIRELESS CONNECTIVITY EQUIPMENT

(75) Inventors: Päivi M. Ruuska, Tampere (FI); Arto Palin, Viiala (FI); Jukka Reunamäki, Tampere (FI)

(73) Assignee: Nokia Corporation, Espoo (FI)

(*) Notice: Subject to any disclaimer, the term of this patent is extended or adjusted under 35 U.S.C. 154(b) by 1558 days.

(21) Appl. No.: 11/018,408

(22) Filed: Dec. 20, 2004

(65) Prior Publication Data

US 2005/0180425 A1    Aug. 18, 2005

Related U.S. Application Data

(60) Provisional application No. 60/544,607, filed on Feb. 13, 2004.

(51) Int. Cl.
*H04W 56/00* (2009.01)

(52) U.S. Cl. .................. 370/278; 370/389; 709/228

(58) Field of Classification Search ........... 370/277, 370/278, 282, 389, 503; 709/220–222, 227–230, 709/237
See application file for complete search history.

(56) References Cited

U.S. PATENT DOCUMENTS

| | | | |
|---|---|---|---|
| 6,664,891 B2 | 12/2003 | Davies et al. | |
| 6,754,469 B1* | 6/2004 | Lee et al. | 455/41.2 |
| 6,829,227 B1* | 12/2004 | Pitt et al. | 370/329 |
| 6,836,211 B2* | 12/2004 | Joo | 340/539.1 |
| 6,901,057 B2* | 5/2005 | Rune et al. | 370/310 |
| 6,973,052 B2 | 12/2005 | Wang et al. | |
| 7,110,784 B2* | 9/2006 | Nasu et al. | 455/517 |
| 7,151,764 B1* | 12/2006 | Heinonen et al. | 370/338 |
| 2001/0055950 A1 | 12/2001 | Davies et al. | |
| 2002/0002034 A1 | 1/2002 | Davies et al. | |
| 2005/0135302 A1 | 6/2005 | Wang et al. | |

FOREIGN PATENT DOCUMENTS

CN    1389045    1/2003

(Continued)

OTHER PUBLICATIONS

English translation of Chinese Office Action dated Apr. 25, 2008 (pp. 1-7) with original Chinese text (pp. 8-12), total pp. 1-12.
Japanese Office Action issued Oct. 30, 2009 in corresponding Japanese Patent Application No. 2006-550358 (4 pages).

(Continued)

*Primary Examiner*—Pankaj Kumar
*Assistant Examiner*—Duc T Duong

(57) ABSTRACT

A method for use by a device communicating according to a short-range wireless connectivity protocol in attempting to establish a connection to another device using an enhanced inquiry and/or paging procedure as part of the connection procedure, the method including a step in which the device transmits a first packet for establishing a connection to the other device, and the other device responds with one or more response packets whose content depends on whether the other device is configured to perform the enhanced procedure. In some embodiments, the first packet is an identifier packet including extension data indicating via a predetermined bit pattern that the device is itself configured to perform the enhanced procedure.

4 Claims, 13 Drawing Sheets

FOREIGN PATENT DOCUMENTS

| | | |
|---|---|---|
| EP | 1370050 | 12/2003 |
| WO | 0201804 A1 | 1/2002 |
| WO | WO 02/25873 | 3/2002 |
| WO | WO 03065288 | 8/2003 |
| WO | WO 03081787 | 10/2003 |
| WO | WO 2004004246 | 1/2004 |

OTHER PUBLICATIONS

English translation of Japanese Office Action mailed Apr. 6, 2010 in corresponding Japanese Patent Application No. 2006-550358 (2 pages).

* cited by examiner

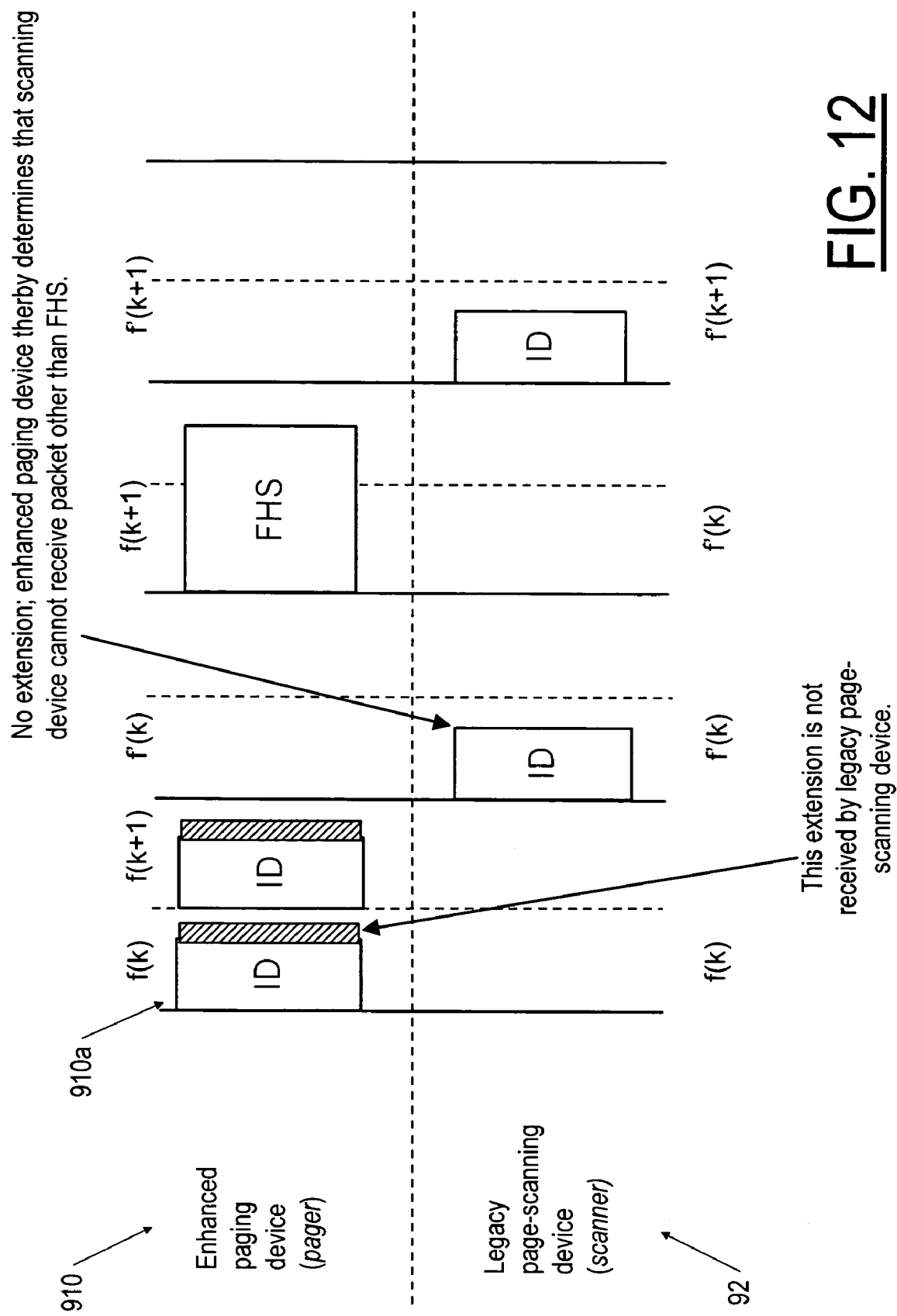

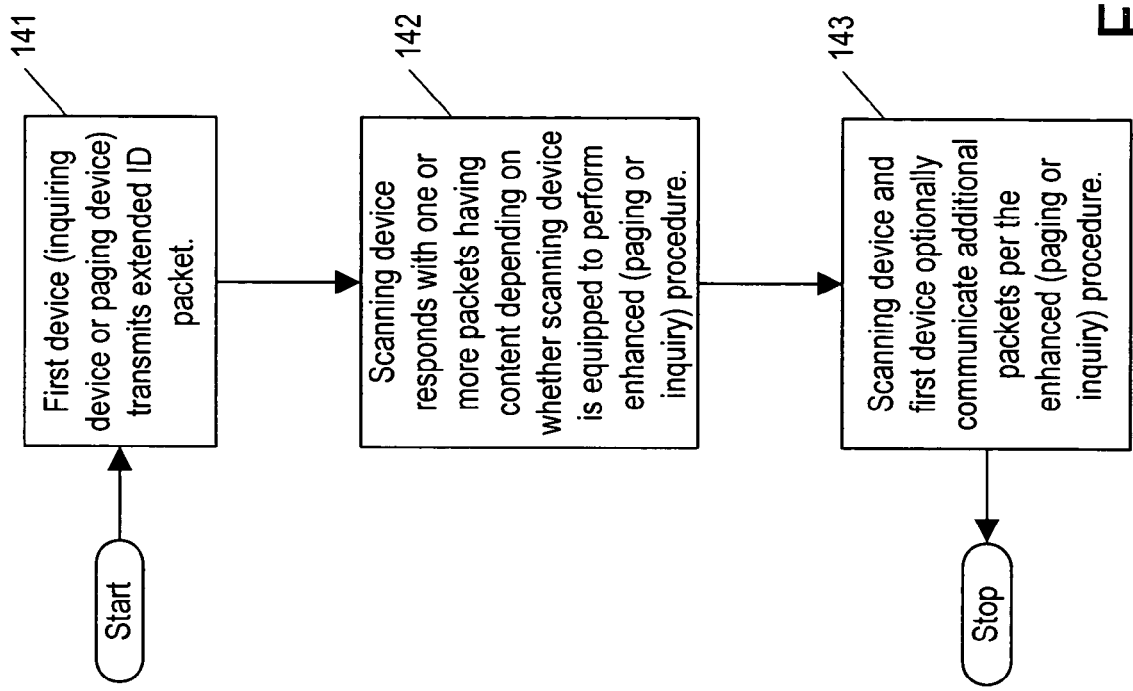
FIG. 14
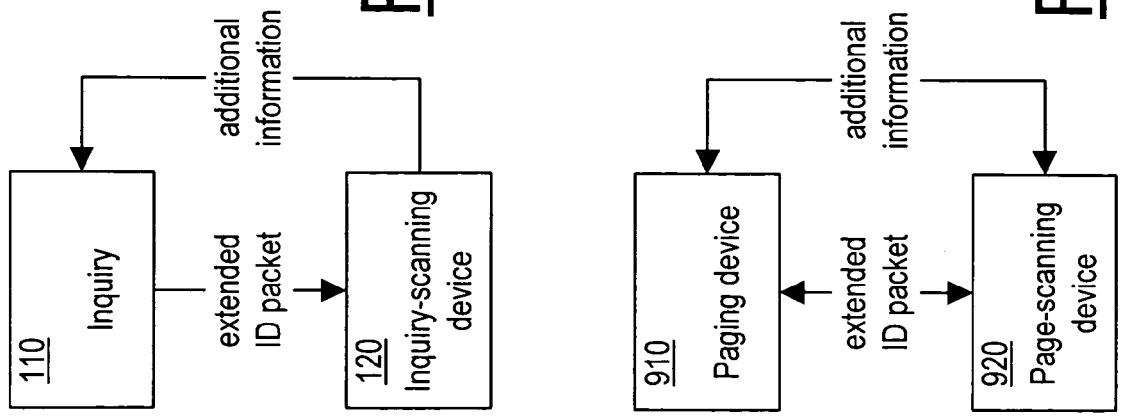
FIG. 13A
FIG. 13B

PROTOCOL FOR INDICATING ENHANCED CAPABILITIES FOR USE BY SHORT-RANGE WIRELESS CONNECTIVITY EQUIPMENT

CROSS REFERENCE TO RELATED APPLICATION

Reference is made to and priority claimed from U.S. provisional application Ser. No. 60/544,607 filed Feb. 13, 2004, entitled PROTOCOL FOR INDICATING ENHANCED CAPABILITIES FOR USE BY SHORT RANGE WIRELESS CONNECTIVITY EQUIPMENT.

TECHNICAL FIELD

The present invention pertains to the field of short-range wireless connectivity. More particularly, the present invention pertains to short-range wireless connectivity between devices according to e.g. Bluetooth.

BACKGROUND ART

Bluetooth 1.2 specification—introducing, among other feature, Adaptive Frequency Hopping (AFH), which is designed to reduce interference between wireless technologies sharing the 2.4 GHz spectrum—has been officially adopted by the so-called Bluetooth Special Interest Group (SIG). However, the Bluetooth SIG continues its work to improve Bluetooth. There are several possible improvements under discussion, including ideas in connection with QoS (quality of service), scatterneting, and connection setup.

In Bluetooth, before any two devices can connect to each other and so communicate with each other, the two devices must go through a device discovery procedure, which, in case of a first device attempting to connect to another device whose address is unknown to the first device, includes two steps: inquiry and paging. The inquiry step/phase is for devices to find each other, while the paging step/phase is to establish actual connections. Any device can initiate a connection. The initiating device then becomes what is called the master. A connection is established by an INQUIRY message, which is followed by a subsequent PAGE message. In case the first device knows the address of the other device, a connection is initiated by a PAGE message.

In the inquiry process devices exchange data to perform actual connection set up (called paging). One of the improvement ideas is to extend the current inquiry procedure in such a way that more information can be sent out during the inquiry process, making it possible to connect to certain devices faster.

The basic idea of the enhanced inquiry process, as illustrated in FIG. 1, is that after an enhanced inquiry-scanning device/scanner 120 responds to an ID packet 11a from an enhanced inquiring device/inquirer 11 by providing an FHS (frequency hop synchronization) packet 12a—used for synchronizing the hop sequence of the communicating devices 110 120—the enhanced scanner 120 then sends out some predefined additional data 12b as an ACL (asynchronous communication link) packet, which could include service discovery and other device information. The additional data is sent on the same frequency as the FHS packet, so as not to collide with the ID packets if the inquirer is a legacy device. The enhanced inquirer 110 can then scan for the additional data and get further information regarding device identification and other properties of the device 120 providing the additional data; with the additional data, the enhanced inquirer can decide more quickly if the device 120 is the one the inquirer 11 is looking for, or offers the services or features the inquirer is looking for.

An enhanced inquirer uses the same ID packets as a non-enhanced/legacy inquirer. Also, an enhanced scanner uses the same FHS packets as a non-enhanced/legacy scanner. Hence, during the inquiry process neither the inquirer nor the scanner can know whether the other supports enhanced inquiry. Because of this, an enhanced scanner will send out the additional information even though the inquirer may not be able to read it. This causes some unnecessary interference in the ISM (industrial-scientific-medical) band in cases where the inquirer cannot read the additional data. FIG. 2 illustrates a case where a legacy inquirer 21 is in communication with an enhanced scanner 12, which transmits the additional data 12b in response to receiving an ID packet 11a from a legacy inquirer 12 since the enhanced scanner 12 cannot determine that the inquirer 12 is non-enhanced, and FIG. 3 illustrates the other case, where an enhanced inquirer searches for the additional data after an FHS packet, even though the scanner sending the FHS packet is a non-enhanced/legacy scanner and so has not transmitted the additional data.

The improvement idea for the inquiry process—i.e. the enhanced inquiry proposal—specifies that the enhanced inquirer only listens for the extra data for a few microseconds; if there is no additional data packet in that time period, it can restart sending ID packets immediately after the time period. However, it is not possible to start sending right after listening only a few microseconds, because the ID packet is transmitted on a different channel than the channel the inquiring device is tuned to for receiving the additional data. Therefore, the inquiring device misses the inquiry response packet if there is a scanner scanning the channel, because of waiting for the additional data.

Another proposal concerning connection setup is an enhanced paging proposal, illustrated in FIG. 9. The method modifies the normal paging procedure to enable devices to exchange small amounts of data without entering an actual connection state; it provides that a paging device 910, i.e. the device acting as master, can transmit any packet in place of an FHS packet. If a page scanning device 920, i.e. the device acting as slave, receives some other packet 91b instead of an FHS packet as the master response, it can then, according to the proposal, respond with any packet 92b. In this way the devices can each wirelessly send to the other a packet of information such as e.g. business cards. If, however, the page scanning device 920 receives an FHS packet (i.e. if the packet 91b is an FHS packet), a connection is set up in the normal way.

A problem like the one for enhanced inquiry occurs also for enhanced paging. If an enhanced paging procedure occurs after a normal inquiry procedure, and if the devices have not been connected before, the paging device does not know whether the page scanning device is capable of enhanced paging or not. As illustrated in FIG. 10, a legacy page-scanning device/slave 92 waits for the FHS packet as a master response. According to Bluetooth specification 1.2, and as shown in FIG. 10, the slave 92 listens as long as no FHS packet is received or until a pagerespTO (8 slots) timer indicates the waiting time is exceeded. If the legacy page-scanning device receives some other packet 91b, it continues to wait to receive an FHS packet. Therefore, the enhanced paging delays connection setup of a page scanning legacy device to other devices.

DISCLOSURE OF THE INVENTION

In view of the above shortcomings of the prior art, in a first aspect of the invention a method is provided, comprising: a step in which a first device transmits a first packet according to a short-range wireless connectivity protocol for establishing a connection; and a step in which a second device receives the first packet and responds according to the short-range wireless connectivity protocol by transmitting one or more response packets; wherein the content of the one or more response packets depends on whether the second device is configured to perform an enhanced procedure.

In accord with the first aspect of the invention, the enhanced procedure may be an enhanced inquiry procedure or an enhanced paging procedure.

Also in accord with the first aspect of the invention, the first packet may include an indication that the first device is configured to perform the enhanced procedure. Further, the first device may be an inquirer device or a paging device and the second device may be a scanning device, and the first packet may be an identifier packet extended to include extension data conveying via a predetermined bit pattern the indication that the first device is configured to perform the enhanced procedure.

Also in accord with the first aspect of the invention, the first device may be an inquirer device or a paging device and the second device may be a scanning device, and the first packet may be an identifier packet and the one or more response packets may include a synchronizing packet. Further, at least one of the one or more response packets may be extended to include extension data conveying via a predetermined bit pattern an indication that the second device is configured to perform the enhanced procedure.

Also in accord with the first aspect of the invention, the method may further comprise a step in which the second device includes in the one or more response packets an indication that the second device transmits packets conveying additional data and the second device includes the additional data following the indication that the second device transmits packets conveying additional data.

Also in accord with the first aspect of the invention, the second device may convey as the one or more response packets synchronizing information per a non-enhanced procedure followed by additional data per the enhanced procedure.

Also in accord with the first aspect of the invention, the enhanced procedure may be an enhanced inquiry procedure and the first device may be an inquiring device and may transmit as the first packet an identifier packet extended to include extension data conveying the indication that the first device is configured to perform the enhanced procedure, and the second device may be a scanning device and in response to the first packet the scanning device may transmit a synchronizing packet followed by packets conveying additional data. Further, the method may also comprise a step in which the scanning device includes in the synchronizing packet an indication that the scanning device transmits packets conveying additional data after transmitting the synchronizing packet.

Also in accord with the first aspect of the invention, the enhanced procedure may be an enhanced paging procedure and the first device may be a paging device and may transmit as the first packet an identifier packet extended to include extension data conveying the indication that the first device is configured to perform the enhanced procedure, and in response the second device may transmit an identifier packet extended to include extension data conveying the indication that the scanning device is configured to perform the enhanced procedure.

In a second aspect of the invention, a computer program product is provided, comprising: a computer readable storage structure embodying computer program code thereon for execution by a computer processor in a device configured for wireless communication according to a short-range wireless communication protocol, with said computer program code comprising instructions for performing a method including: a step in which the device transmits a first packet according to a short-range wireless connectivity protocol for establishing a connection to another device; and a step in which the device receives one or more response packets from the other device and uses the one or more response packets to determine whether the other device is configured to perform an enhanced procedure.

In a third aspect of the invention, a device for communicating according to a short-range wireless connectivity protocol is provided, the device comprising: means by which the device transmits a first packet according to a short-range wireless connectivity protocol for establishing a connection to another device; and means by which the device receives one or more response packets from the other device, and uses the content of the one or more response packets to determine whether the other device is configured to perform an enhanced procedure.

In a fourth aspect of the invention, a system is provided, comprising a plurality of devices for communicating according to a short-range wireless connectivity protocol, at least one of which devices is according to the third aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIG. 12 is a signaling/timing diagram illustrating enhanced paging with an extended ID packet, according to the invention, and a legacy (prior art) device.

FIGS. 13A and 13B are block diagrams showing the essential signalling of the invention by which two devices communicate that one or another of them is equipped to perform an enhanced inquiry or paging procedure.

FIG. 14 is a flow chart indicating steps performed by the two devices of FIGS. 13A and 13B in signalling according to the invention.

DETAILED DESCRIPTION OF THE INVENTION

According to the invention, in case of an inquiring (telecommunication) device and a scanning (telecommunication) device communicating according to a short-range wireless connectivity protocol, where the inquiring device transmits a first packet—typically an ID packet—and in response the scanning device transmits a second packet—which, in case the second device operates according to the invention, is typically a packet including information about the second device, such as services offered by the second device—and the inquiring device includes in the first packet an indication that the inquiring device is adapted to perform an enhanced procedure. Thus, according to the invention, in an enhanced inquiry procedure, an enhanced inquirer adds some extra bits to the ID packets it transmits so that an enhanced scanner knows that the enhanced inquirer can receive the additional data of the prior art, or in an enhanced paging procedure, an enhanced paging device knows that an enhanced page scanning device can receive any packet instead of only an FHS packet. Moreover, in some embodiments, some undefined bits in the inquiry scanner response packets (FHS packet) are used to indicate that the scanner is an enhanced scanner and so communicates the additional data.

Figure 1:
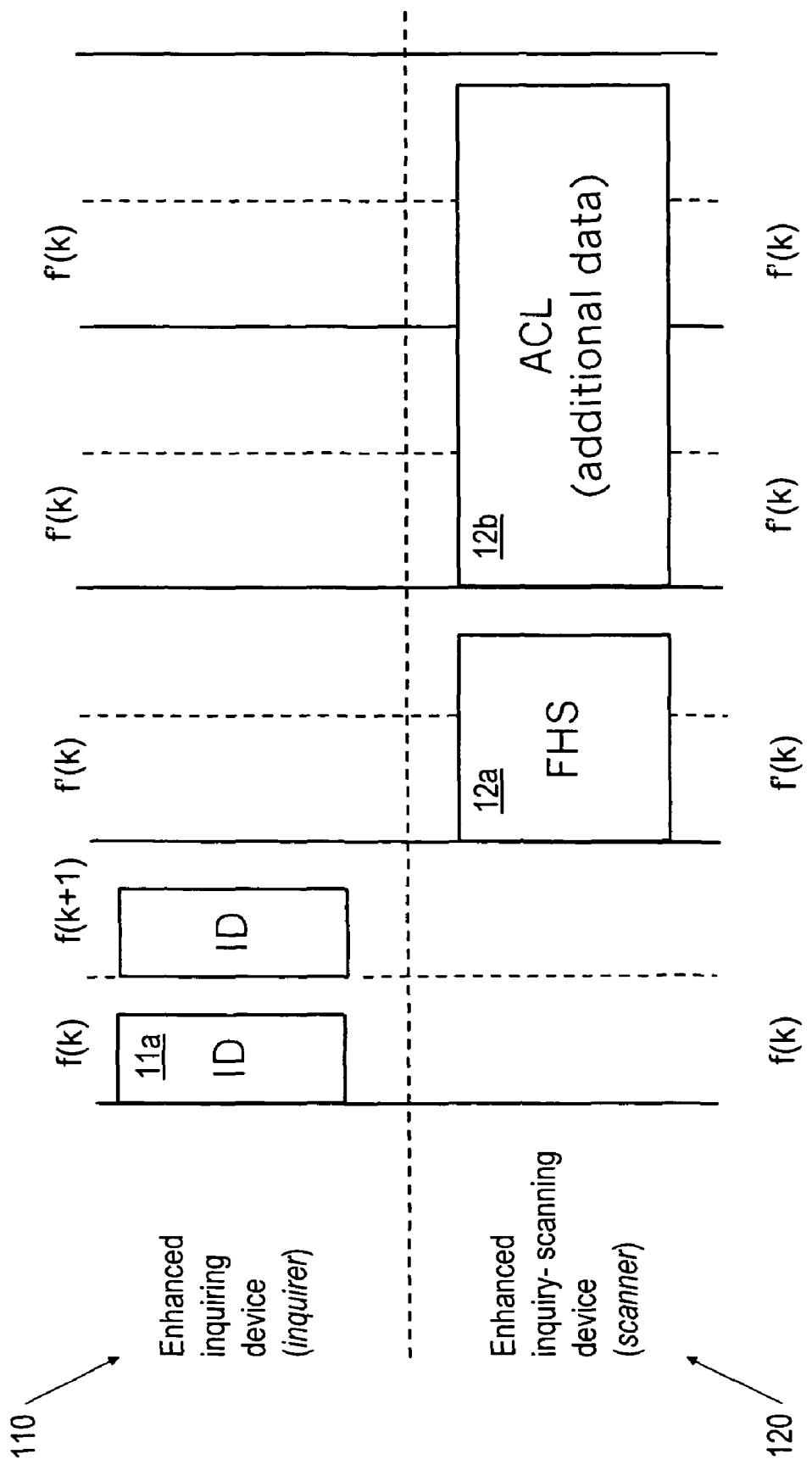
FIGS. 1-3 are signaling/timing diagrams showing signaling for enhanced inquiry per the prior art.
Figure 9:
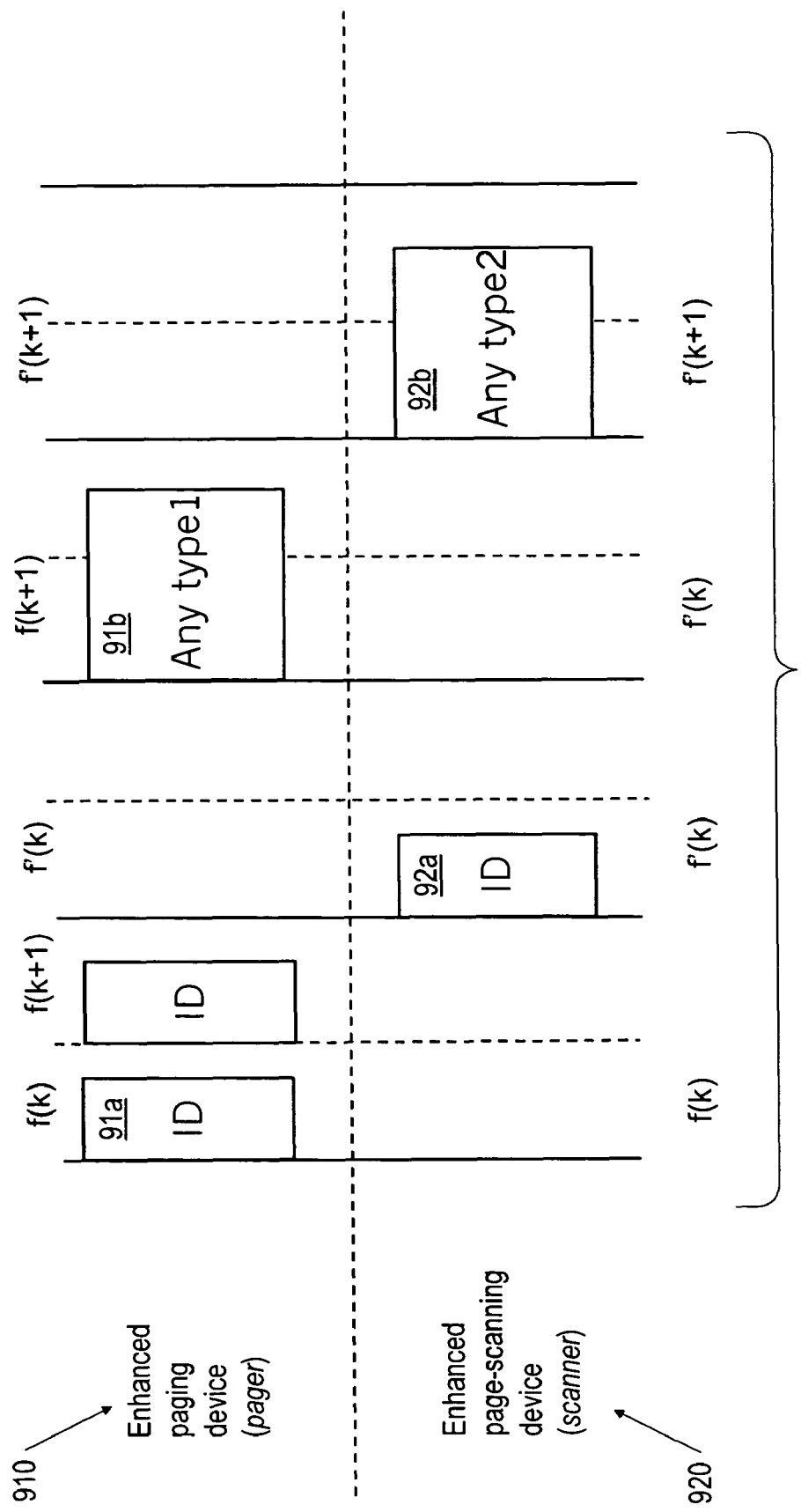
FIG. 9 is a signaling/timing diagram illustrating enhanced paging, according to the prior art.
Figure 10:
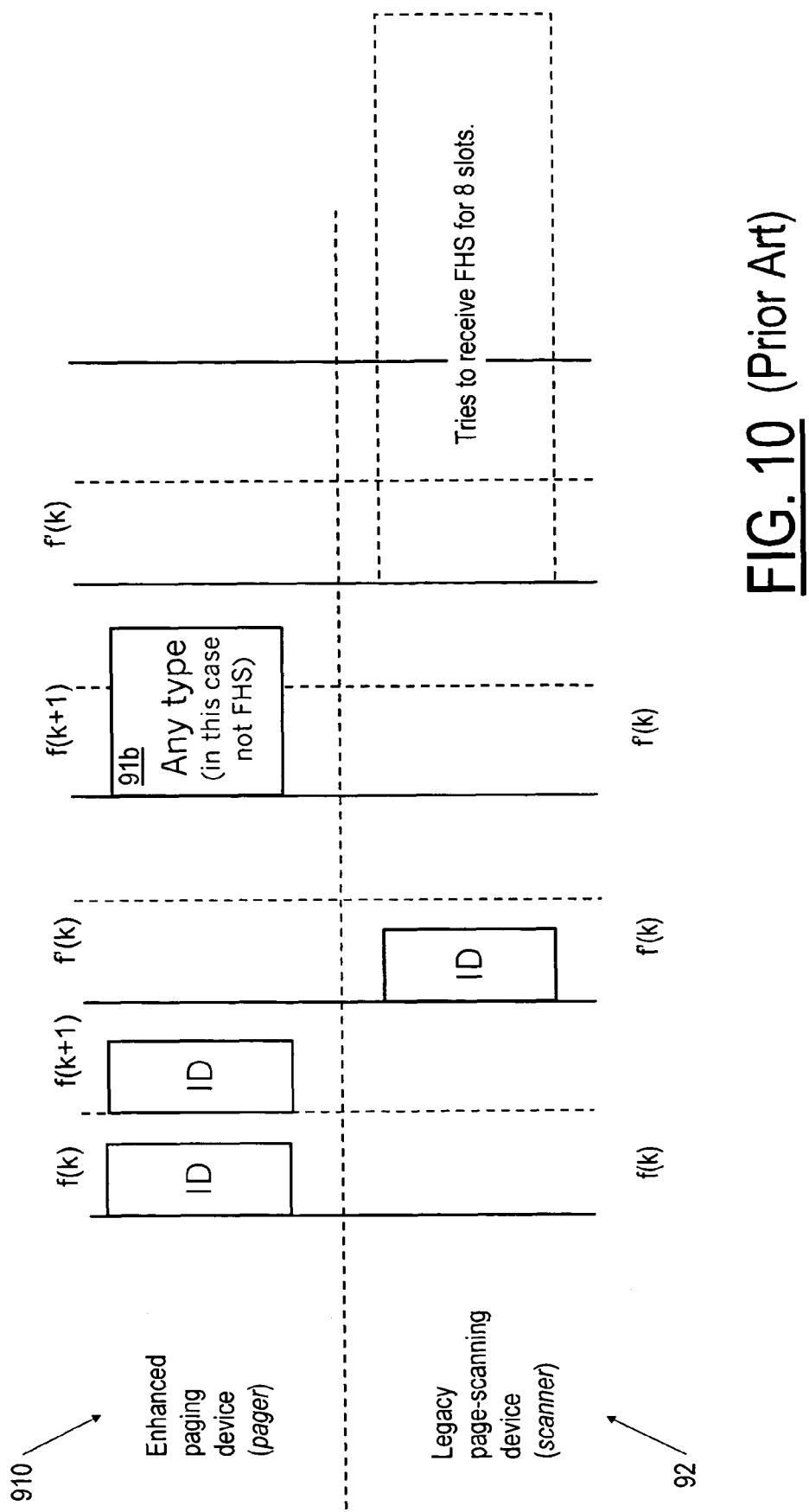
FIG. 10 is a signaling/timing diagram illustrating the enhanced paging problem of the prior art.

The ID packet—for either enhanced inquiry or enhanced paging—is extended (see e.g. FIGS. 7 and 11, and compare with FIGS. 1 and 9, respectively) according to the invention with some bits to indicate that the inquirer/pager operates according to the invention, and so, in case of enhanced inquiry (see e.g. FIG. 7), has the capability for receiving the additional data from the scanner data after receiving the FHS packet from the scanner, and in case of enhanced paging (see e.g. FIG. 11), can provide to a scanner additional data, not only an FHS packet, after transmitting an ID packet.

Figure 6:
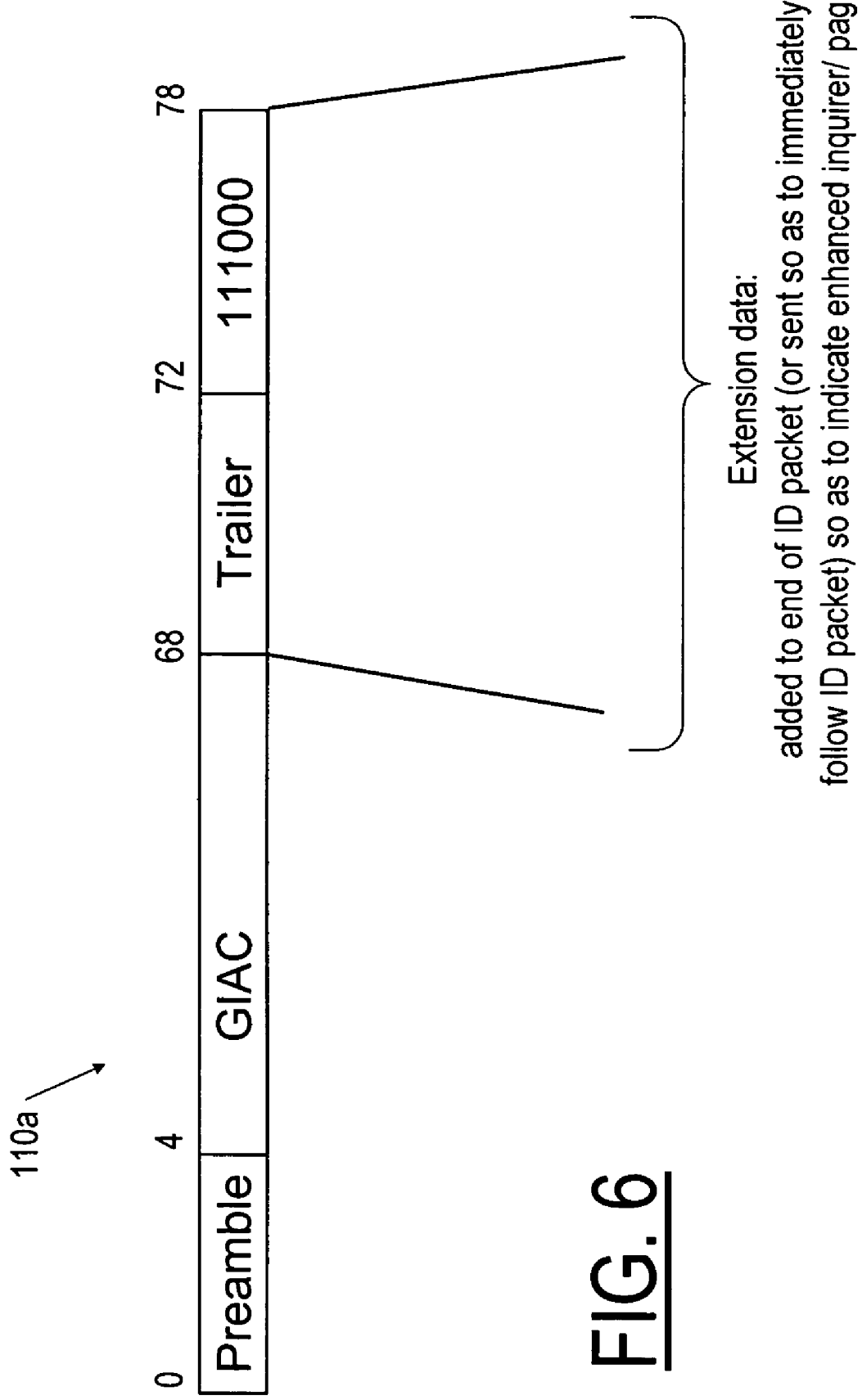
FIG. 6 is a signaling/timing diagram illustrating an extension of an ID packet, according to the invention, to indicate an inquirer capability to receive scanner data after an FHS packet.
Figure 7:
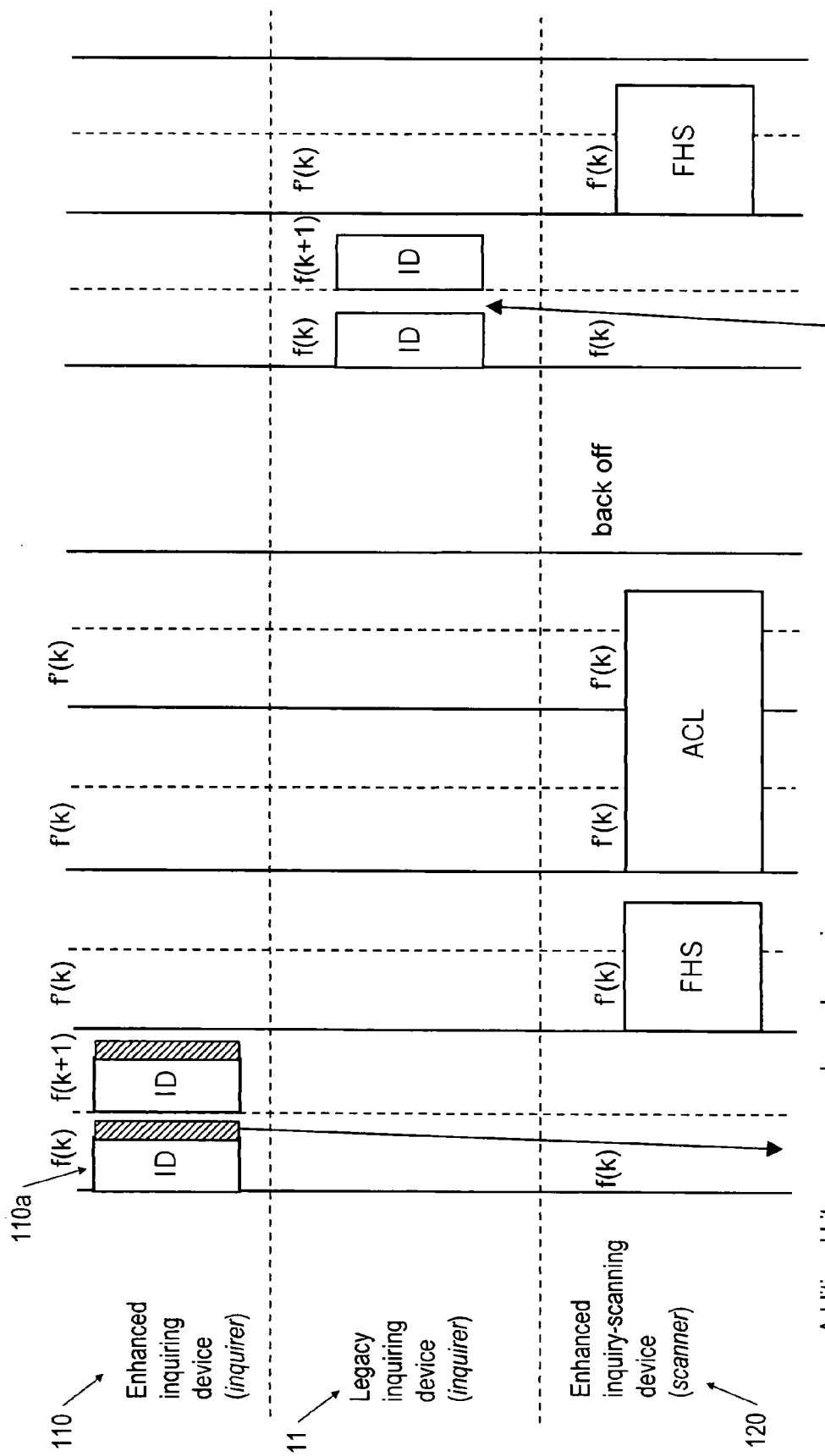
FIGS. 7 and 8 are signaling/timing diagrams illustrating the usage of a bit sequence after the normal bits of an ID packet, according to the invention.
Figure 8:
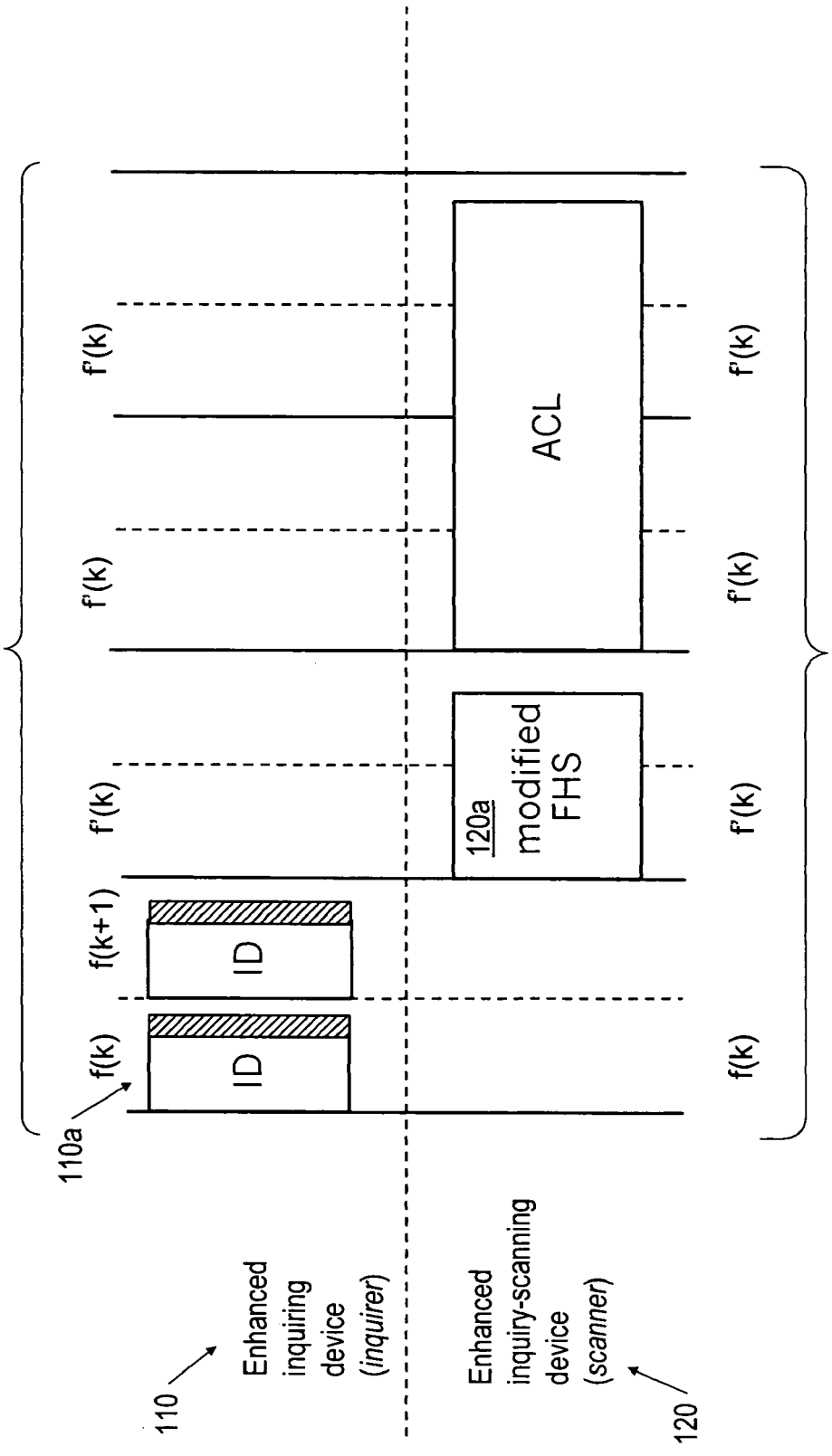

The extension could be e.g. similar to that used in a prior art multicast acknowledgement packet proposal. Such an extension is illustrated in FIG. 6, showing an ID packet 110a extended so as to indicate that the transmitting device (inquirer or pager) operates according to the invention. The usage of the extension bit sequence after the prior art portions of an ID packet is illustrated in FIGS. 7 and 8. The extension includes a trailer portion followed by a portion conveying the bits 111000, both of which follow the prior art ID packet, which includes a preamble portion and a GIAC (General Inquire Access Code) portion. (The prior art ID packet is a 68-bit packet used in paging, inquiry and response routines. It is essentially the device access code (DAC) or inquiry access code (IAC). The GIAC portion is the default inquiry code which is used to discover all devices in range.)

According to the invention, an enhanced scanner reads an ID packet extended according to the invention and so determines whether the inquirer operates according to the invention. Scanners that do not support enhanced inquiry do not try to read the extension of the ID packet, i.e. an ID packet for such legacy scanners seems to be just a normal (non-extended) ID packet.

Figure 4:
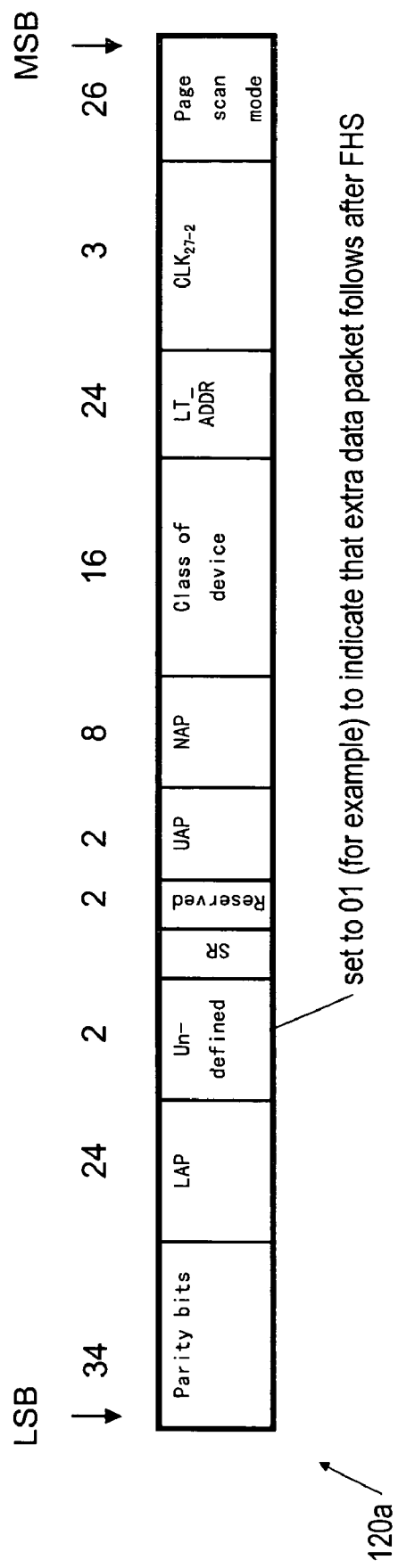
FIG. 4 is a schematic of an inquiry response packet (FHS-packet).

FIG. 4 shows an inquiry-response packet (i.e. an FHS packet) of the prior art but further specified according to the invention. In an FHS packet of the prior art there is a 2-bit undefined field, as shown in FIG. 4. Bluetooth 1.2 states that the undefined field is for future use and shall be set to zero. According to the invention, the undefined field is used to indicate extended scanner capability. For example, a value of 01 for the undefined field could be used to indicate extended scanner capability, i.e. to indicate that the scanner is sending out extra data (the additional data) after sending out the FHS packet.

Figure 5:
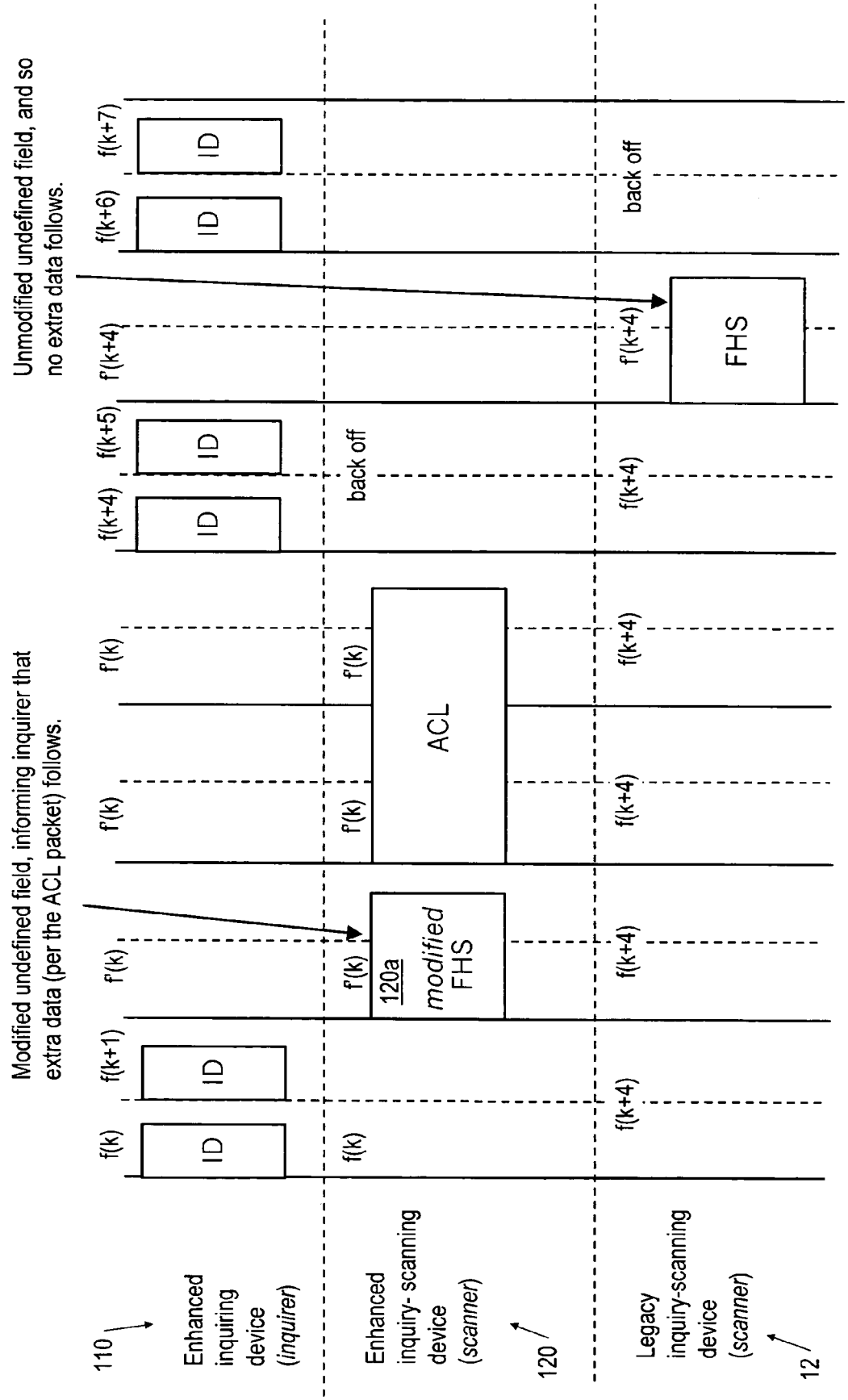
FIG. 5 is a signaling/timing diagram illustrating the usage of a modified undefined field in the FHS packet, according to the invention.

As shown in FIG. 5, an enhanced inquirer 110 operating according to the invention can detect the bits in an FHS packet 120a modified according to the invention and so can determine that there will be some extra data after the FHS packet. Therefore, an enhanced inquirer need not try to receive extra data packet after every received FHS packet, but would try to do so only in case of receiving an FHS packet modified according to the invention, and so having a non-zero value for the undefined field. An inquirer that does not support enhanced inquiry ignores the undefined field, and so the undefined field—whether zero or otherwise—has no effect on the operation of such a device.

It is important to note that, consistent with what is illustrated in FIG. 5, an enhanced inquirer 110 operating according to the invention need not necessarily inform an inquiry-scanning device 120 that it is equipped to perform the enhanced inquiry-scanning procedure. The enhanced inquiry-scanning device 120 can inform the enhanced inquirer 110 that there will be some extra data (the ACL packet) after the FHS packet 120a simply by sending the modified FHS packet 120a, regardless of whether the enhanced inquiry-scanning device 120 receives from the inquirer device 110 any indication that it is enhanced.

Figure 2:
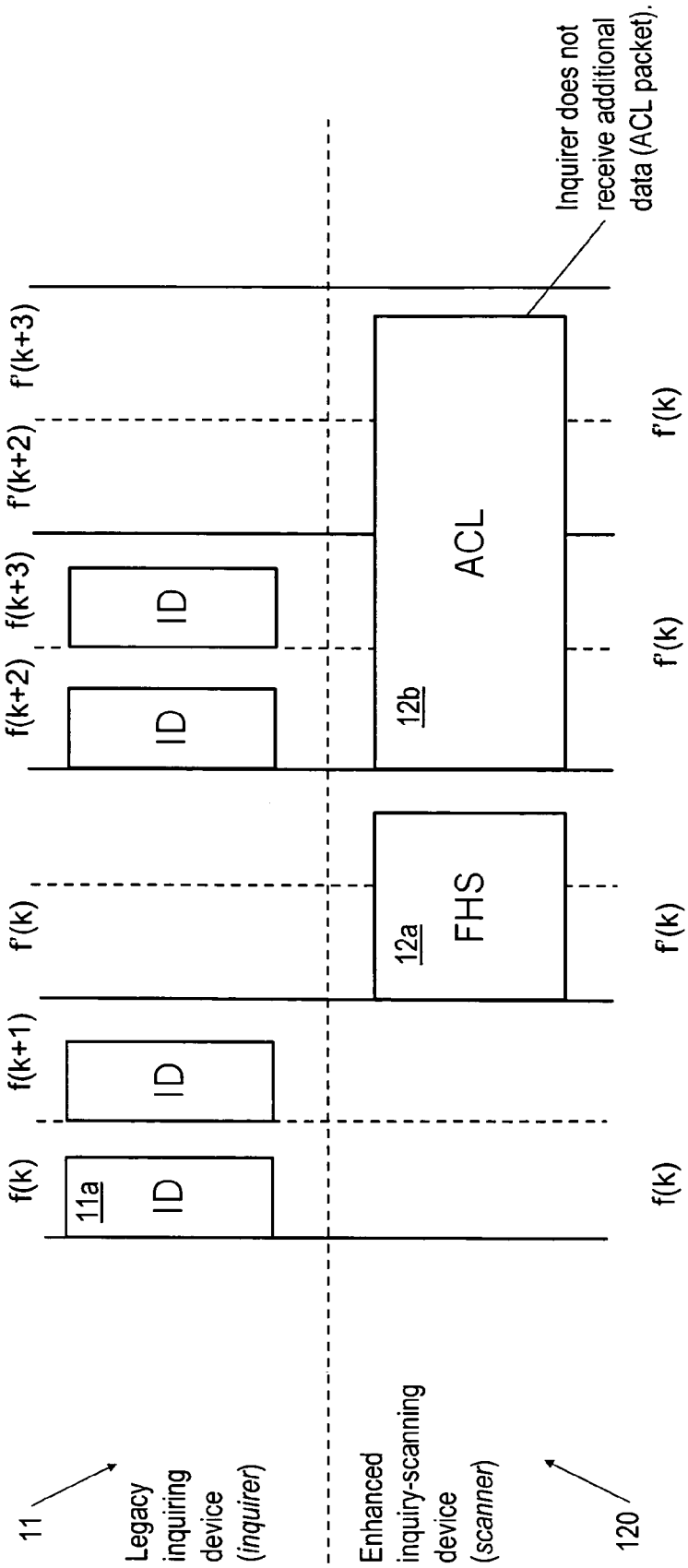
Figure 3:
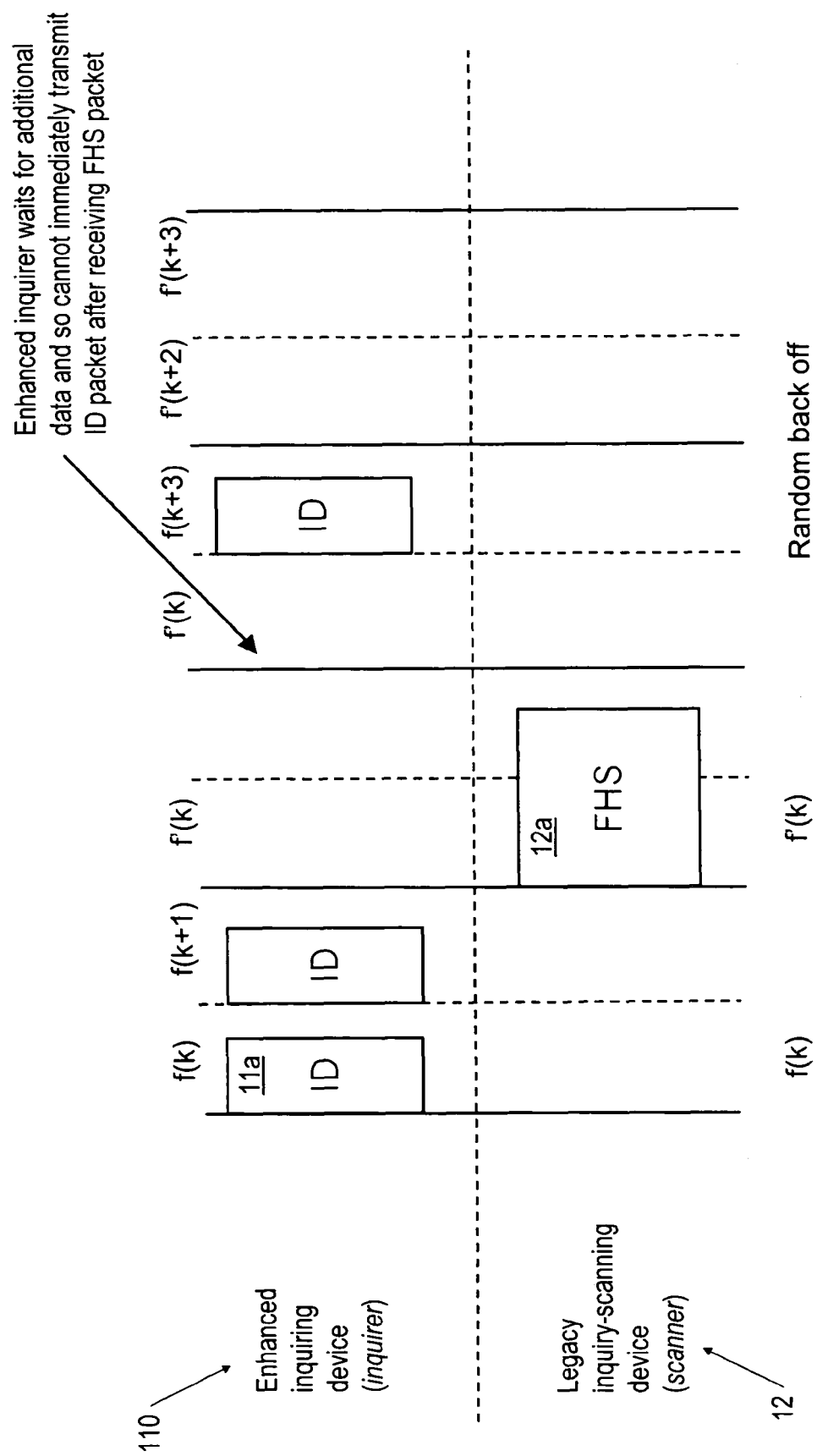

The additional bit sequence after (added to the end of) the inquiry ID packet 110a (FIG. 7) (so as to provide an ID packet modified according to the invention) solves the problem presented in FIG. 2, i.e. the problem of arranging that a scanning device transmits extra data only if the inquiring device is adapted (per e.g. the prior art) to receive it. The modified undefined field in the FHS packet 120a (i.e. defining a value for the undefined field so as to indicate that the scanner sends the additional data after the FHS packet) solves the problem presented in FIG. 3, i.e. the problem of arranging that the inquiring device tries to receive extra data after the FHS packet only when the scanning device does actually provide the extra data (i.e. the additional data).

As shown in FIG. 8, both the modified ID packet 110a and the modified FHS packet 120a can be used. Then both the enhanced inquirer 110 and the enhanced scanner 120 can determine that the other is adapted for enhanced inquiry.

Figure 11:
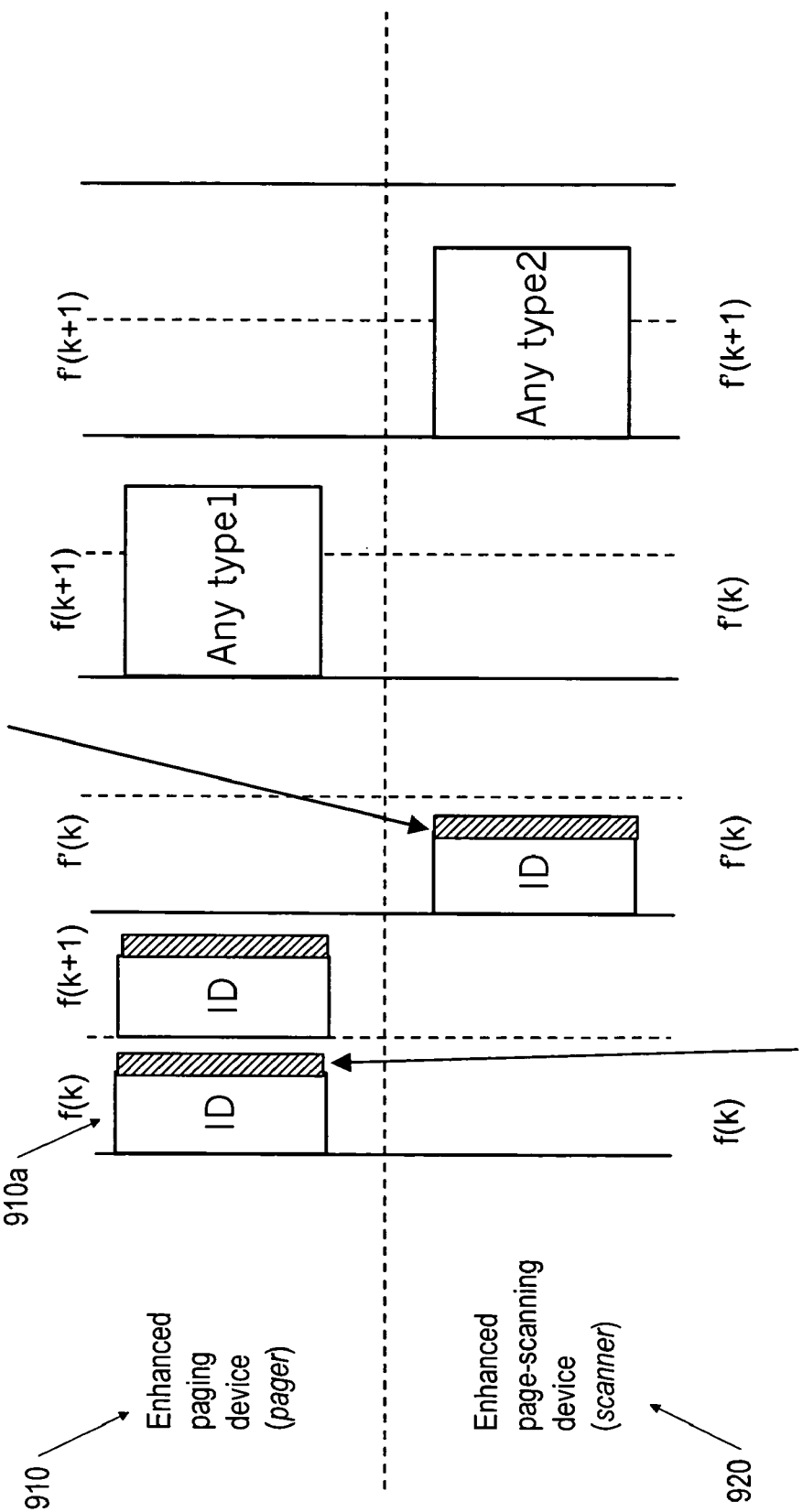
FIG. 11 is a signaling/timing diagram illustrating an ID packet per the invention and so including bits indicating that the device is adapted to provide enhanced paging.

In addition to using the extension of the inquiry ID packet to improve enhanced inquiry, the extension can also be used in ID packets to improve the paging procedure. As shown in FIG. 11, in an enhanced paging procedure according to the invention, an enhanced paging device 910 operating according to the invention transmits an ID packet 910a (using the so-called device access code (DAC) of the paging device) with an extension for indicating that the paging device is an enhanced paging device (modified according to the invention to send the additional data with the ID packet) and so (because it is an enhanced paging device according to the prior art but modified by the invention to provide the extension data with the ID packet) provides other than FHS data after it sends an ID packet. A page-scanning device 920 operating according to the invention receives and reads the bits of the extension data (FIG. 6).

As also illustrated in FIG. 11, the page-scanning device can indicate it is capable of the enhanced paging procedure by responding with an extended ID packet, i.e. an ID packet per the invention and so including bits indicating that the device is adapted to provide enhanced paging. A legacy page-scanning device would not receive the extended bits after (included in) the (normal) ID packet bits, and so would respond normally to the ID packet. In that case, because the paging device would not receive an ID packet with the extended bits, it would know that the page-scanning device is a legacy device and so the page-scanning device will, according to the invention, not try to transmit any packet except for the FHS packet. Enhanced paging with an extended ID, according to the invention, and a legacy device is illustrated in FIG. 12.

It is worthwhile noting that for interoperability it is advantageous for a page scanning device to respond with an extended ID packet if it is capable of enhanced paging, but it is not necessary to the invention.

The invention has been described in terms (primarily) of the steps of a method. The invention also comprehends an apparatus for performing the above described steps. Thus, for each step described above, there can be a corresponding module of an apparatus, although it is also possible for the functionality for performing more than one of the above-described steps to be incorporated into a single module. Such modules may be implemented as hardware, or may be implemented as software or firmware for execution by a processor. In particular, in the case of firmware or software, the invention is provided as a computer program product including a computer readable storage structure embodying computer program code with instructions corresponding to the described method—i.e. the software or firmware—thereon for execution by a computer processor.

Thus, and referring now to FIGS. 13A and 13B and also to FIG. 14, according to the invention in a first step 141 a first device—which could be a device 110 performing the inquiring step of the connection setup or a device 910 performing the paging step of the connection setup—transmits as a first packet an ID (identifier) packet including extension data for indicating that the first device is equipped to perform an enhanced procedure (either an enhanced inquiry procedure or an enhanced paging procedure, depending on whether the device is performing the inquiring or paging step of the connection setup). In a second step 142, a scanning device—which could be an inquiry-scanning device 120 or a page-scanning device 920—responds to the device with one or more packets having content depending on whether scanning device is equipped to perform the enhanced (paging or inquiry) procedure. In an optional third step 143, the scanning device and the first device communicate additional packets per the enhanced (paging or inquiry) procedure. In both the enhanced inquiring procedure and the enhanced paging procedure, as shown in FIGS. 13A and 13B, the scanning device communicates to the first device additional information about itself, and, at least in case of the paging procedure, the first device also communicates additional information to the scanning device.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. Apparatus, comprising:
a packet transmitting module, configured to transmit an identifier packet according to a short-range wireless protocol; and
a packet receiving module, configured to receive one or more response packets from a device, and for using the content of the one or more response packets to determine whether the device is configured to perform an enhanced procedure,
wherein the apparatus is an inquirer apparatus or a paging apparatus and the one or more response packets include a synchronizing packet, wherein the one or more response packets include synchronizing information per a non-enhanced procedure followed by additional data per the enhanced procedure.

2. Apparatus, comprising:
a packet receiving module, for receiving from a device a packet according to a short-range wireless discovery protocol; and
a packet transmitting module, for transmitting one or more response packets to the device with content useable by the device for determining whether the apparatus is configured to perform an enhanced procedure,
wherein the apparatus is configured to convey as the one or more response packets synchronizing information per a non-enhanced procedure followed by additional data per the enhanced procedure.

3. Method, comprising:
transmitting, from a packet transmitting module of an apparatus, an identifier packet according to a short-range wireless protocol, and
receiving, in a packet receiving module of the apparatus, one or more response packets from a device, and using the content of the one or more response packets to determine whether the device is configured to perform an enhanced procedure,
wherein the apparatus is an inquirer apparatus or a paging apparatus and the one or more response packets include a synchronizing packet, wherein the one or more response packets include synchronizing information per a non-enhanced procedure followed by additional data per the enhanced procedure.

4. Method, comprising:
receiving, in a packet receiving module of an apparatus, a packet from a device according to a short-range wireless discovery protocol, and
transmitting, from a packet transmitting module of the apparatus, one or more response packets to the device with content useable by the device for determining whether the apparatus is configured to perform an enhanced procedure,
wherein the apparatus is configured to convey as the one or more response packets synchronizing information per a non-enhanced procedure followed by additional data per the enhanced procedure.

* * * * *